United States Patent
Ku et al.

(10) Patent No.: US 10,667,152 B2
(45) Date of Patent: May 26, 2020

(54) METHOD AND DEVICE FOR TERMINAL PERFORMING CHANNEL STATE MEASUREMENT IN WIRELESS COMMUNICATION SYSTEM

(71) Applicant: LG ELECTRONICS INC., Seoul (KR)

(72) Inventors: Gwanmo Ku, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 15/574,098

(22) PCT Filed: Apr. 18, 2016

(86) PCT No.: PCT/KR2016/003988
§ 371 (c)(1),
(2) Date: Nov. 14, 2017

(87) PCT Pub. No.: WO2016/186323
PCT Pub. Date: Nov. 24, 2016

(65) Prior Publication Data
US 2019/0223032 A1     Jul. 18, 2019

Related U.S. Application Data

(60) Provisional application No. 62/161,895, filed on May 15, 2015.

(51) Int. Cl.
*H04W 24/08* (2009.01)
*H04B 17/309* (2015.01)
(Continued)

(52) U.S. Cl.
CPC .......... *H04W 24/08* (2013.01); *H04B 17/309* (2015.01); *H04B 17/318* (2015.01); *H04B 17/336* (2015.01)

(58) Field of Classification Search
CPC ... H04W 36/30; H04W 72/082; H04W 24/08; H04B 17/309; H04B 17/336
See application file for complete search history.

(56) References Cited

U.S. PATENT DOCUMENTS

2011/0110251 A1* 5/2011 Krishnamurthy ... H04W 72/082
370/252
2013/0344873 A1 12/2013 Sane et al.
(Continued)

OTHER PUBLICATIONS

CMCC, "Discussion on introducing RS-SINR measurement", R2-151213, 3GPP TSG RAN WG2 #89bis, Bratislava, Slovakia, Apr. 20-24, 2015, <http://www.3gpp.org/ftp/tsg_ran/WG2_RL2/TSGR2_89bis/Docs> See section 1-3.
(Continued)

*Primary Examiner* — Mansour Oveissi
(74) *Attorney, Agent, or Firm* — Dentons US LLP

(57) ABSTRACT

Provided are a method for a terminal performing channel state measurement in a wireless communication system, and a device supporting same. A terminal may measure the reference symbol received quality (RSRQ) of a neighboring cell, compare the measured RSRQ of the neighboring cell with a RSRQ critical value, and if the measured RSRQ of the neighboring cell exceeds the RSRQ critical value, perform the measurement of the reference signal signal-to-interference-and-noise ratio (RS-SINR) of the neighboring cell.

5 Claims, 7 Drawing Sheets

(51) Int. Cl.
 *H04B 17/318* (2015.01)
 *H04B 17/336* (2015.01)

(56) References Cited

U.S. PATENT DOCUMENTS

2015/0029995 A1   1/2015  Krishnamurthy et al.
2017/0013631 A1*  1/2017  Takahashi ............ H04W 24/10

OTHER PUBLICATIONS

CMCC, "Consideration on the introduction of SINR Measurement", R2-132329, 3GPP TSG-RAN WG2 Meeting #83, Barcelona, Spain, Aug. 19-23, 2013, <http://www.3gpp.org/ftp/tsg_ran/WG2_RL2/TSGR2_83/docs>, See section 2-3.
Qualcomm Incorporated et al., "Consideration on RS-SINR measurement", R2-151089, 3GPP TSG-RAN WG2 Meeting #89bis, Bratislava, Slovakia, Apr. 20-24, 2015, <http://www.3gpp.org/ftp/tsg_ran/WG2_RL2/TSGR2_89bis/Docs>, See section 1-2.

* cited by examiner

METHOD AND DEVICE FOR TERMINAL PERFORMING CHANNEL STATE MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2016/003988, filed on Apr. 18, 2016, which claims the benefit of U.S. Provisional Application No. 62/161,895 filed on May 15, 2015, the contents of which are all hereby incorporated by reference herein in their entirety.

BACKGROUND OF THE INVENTION

Field of the Invention

The present invention relates to a wireless communication system, and more particularly, to a method for measuring, by a UE, a channel state based on a RSRQ threshold in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Meanwhile, a wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

SUMMARY OF THE INVENTION

Reference symbol received quality (RSRQ) is easy to obtain due to simple calculation but may not guarantee optimal throughput in a high-SINR area. Reference signal signal-to-interference-and-noise ratio (RS-SINR), however, is suitable to represent achievable throughput as compared with RSRQ but may involve additional power consumption due to complicated expression. In solve the foregoing problems, the present invention proposes a method for measuring a channel state by applying a RSRQ threshold, and a device supporting the same.

According to one embodiment, there is provided a method for measuring, by a UE, a channel state in a wireless communication system. The method may include: measuring a reference symbol received quality (RSRQ) of a neighboring cell; comparing the measured RSRQ of the neighboring cell with a RSRQ threshold; and measuring a reference signal signal-to-interference-and-noise ratio (RS-SINR) of the neighboring cell when the measured RSRQ of the neighboring cell exceeds the RSRQ threshold.

The UE may further include stopping measuring the RS-SINR of the neighboring cell when the measured RSRQ of the neighboring cell is the RSRQ threshold or less.

The RS-SINR of the neighboring cell may be measured in an initial measurement step, and the initial measurement step may be a step in which the UE is not measuring the RS-SINR of the neighboring cell.

The UE may further include measuring the RS-SINR of the neighboring cell when a value of the measured RSRQ of the neighboring cell plus a hysteresis exceeds the RSRQ threshold. The hysteresis may be applied in a subsequent measurement step, and the subsequent measurement step is a step in which the UE may be measuring the RS-SINR of the neighboring cell. The hysteresis may be a positive number.

The UE may further include stopping measuring the RS-SINR of the neighboring cell when a value of the measured RSRQ of the neighboring cell plus a hysteresis is the RSRQ threshold or less. The hysteresis may be applied in a subsequent measurement step, and the subsequent measurement step may be a step in which the UE is measuring the RS-SINR of the neighboring cell.

The RSRQ threshold may be set by the UE. The RSRQ threshold may be received from a network.

According to another embodiment, there is provided a UE for measuring a channel state in a wireless communication system. The UE may include: a memory; a transceiver; and a processor to connect the memory and the transceiver, wherein the processor may be configured to: measure a reference symbol received quality (RSRQ) of a neighboring cell; compare the measured RSRQ of the neighboring cell with a RSRQ threshold; and measure a reference signal signal-to-interference-and-noise ratio (RS-SINR) of the neighboring cell when the measured RSRQ of the neighboring cell exceeds the RSRQ threshold.

It is possible to efficiently measure a channel state.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
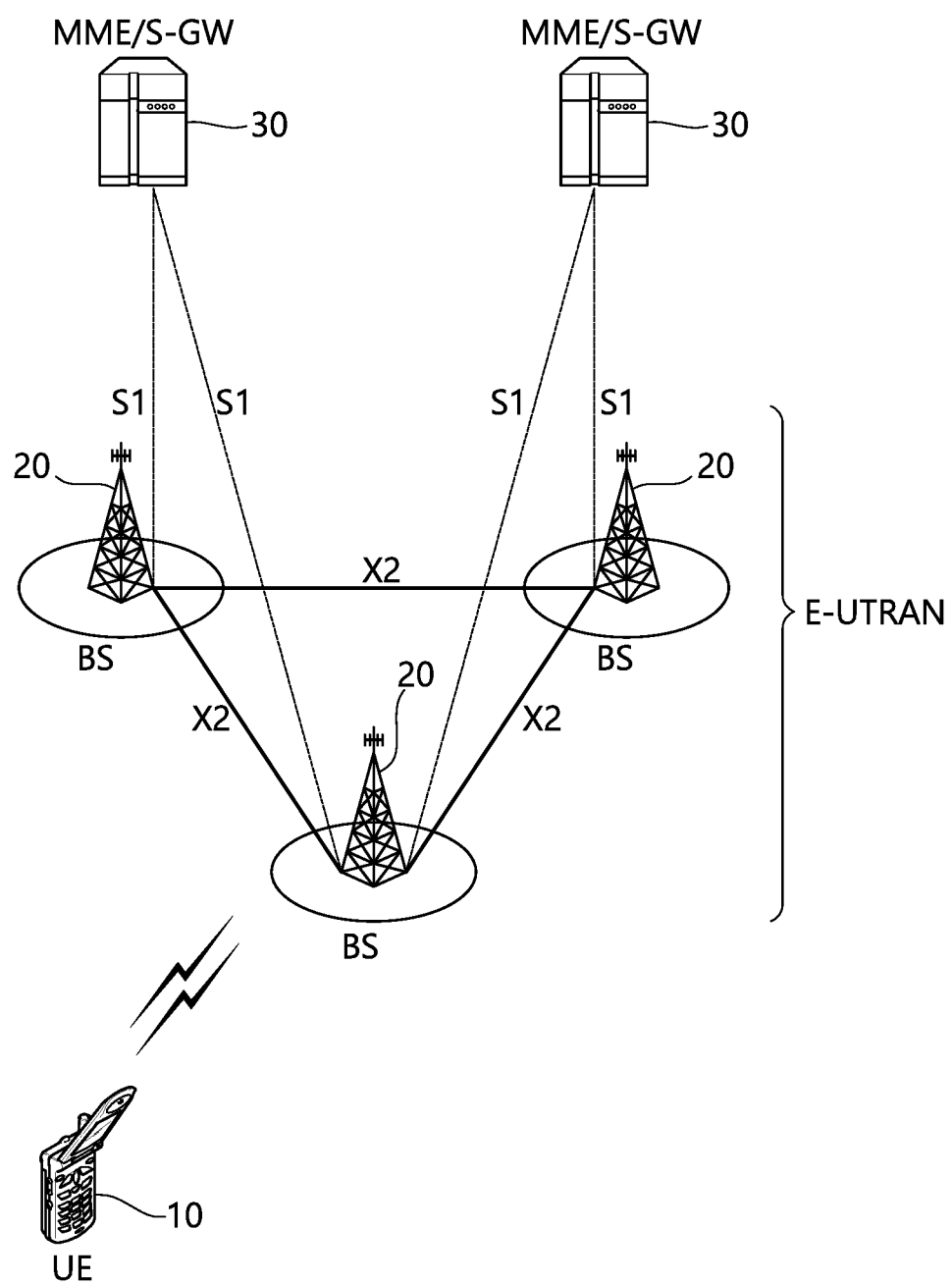
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
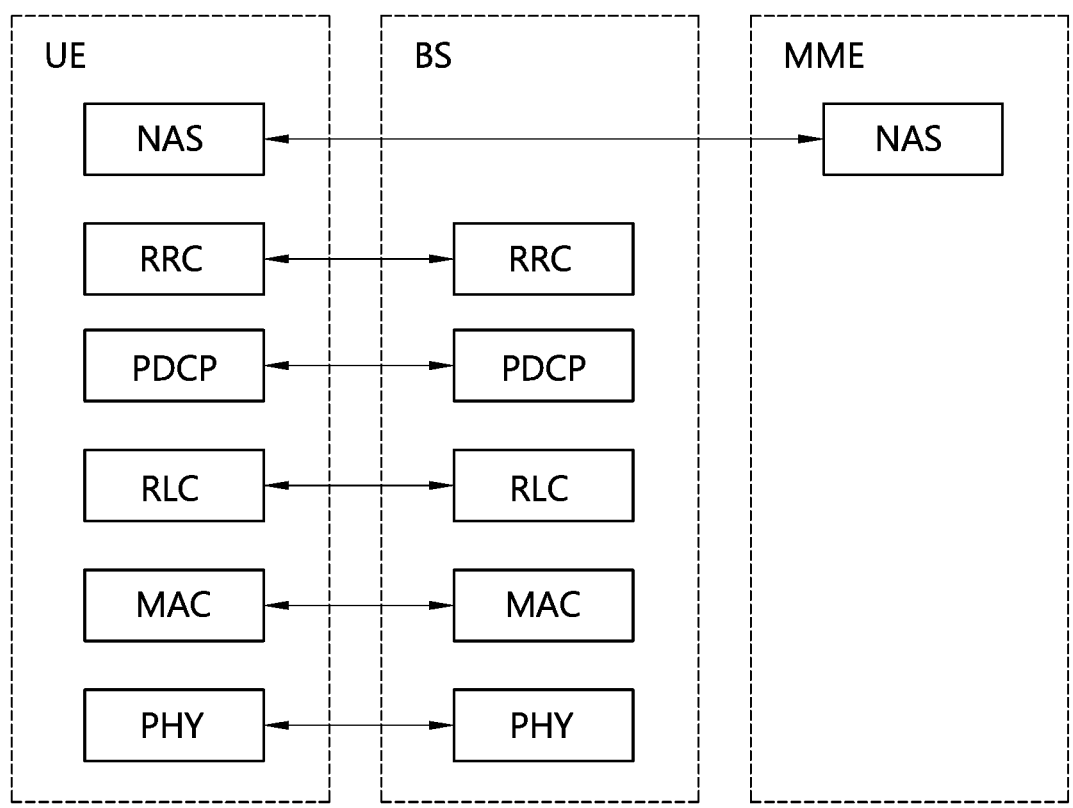
FIG. 2 shows a control plane of a radio interface protocol of an LTE system.
Figure 3:
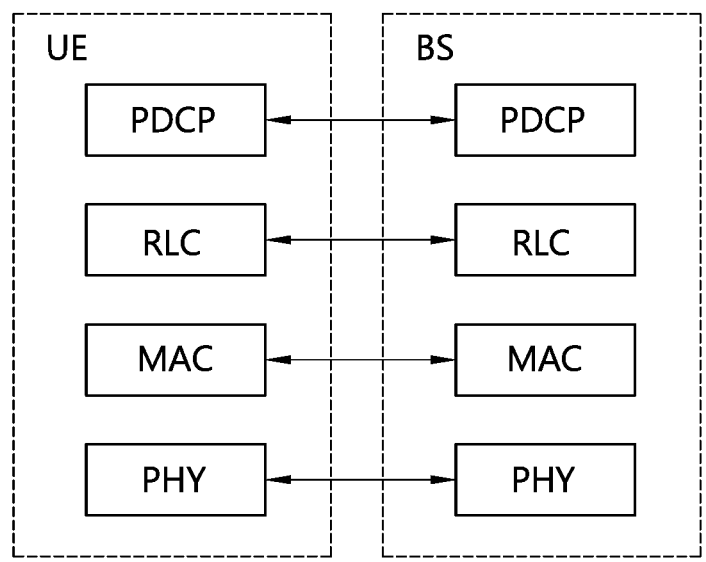
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-topoint channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, reference signal signal-to-interference-and-noise ratio (RS-SINR) is described.

Measuring RS-SINR is important for service providers. The reason why service providers prefer RS-SINR to RSRQ is mainly because RS-SINR is closely associated with throughput. A network may evaluate throughput based on RS-SINR for optimization. However, RS-SINR also has disadvantages. Hereinafter, the advantages and disadvantages of RS-SINR and RSRQ are described.

RSRQ may be defined by Equation 1.

$$RSRQ = \frac{N \times RSRP}{RSSI} \qquad \text{[Equation 1]}$$

RSRP denotes the average received power of all REs carrying CRSs transmitted over the entire band, and RSSI denotes received power (including signals, interference, and thermal noise) measured throughout the entire band. N denotes the number of RBs.

RS-SINR may be defined by Equation 2.

$$RS-SINR = \frac{E_{CRS}}{I_{CRS} + N_{CRS}}$$ [Equation 2]

$E_{CRS}$ denotes the average power for CRSs in the entire system bandwidth for a serving cell, $I_{CRS}$ denotes cell interference, and $N_{CRS}$ denotes thermal noise.

A main disadvantage of RSRQ is that RSRQ is associated with the load of a serving cell because RSSI includes received power measured in the entire band (that is, received power measured from CRSs and data of the serving cell and an interfering cell). That is, a change in the load of the serving cell can cause a significant impact on a RSRQ value. Thus, it may be difficult for the network to assess correct throughput based on reported RSRQ. Also, RSRQ may have a limited range. A RSRQ range limit is described in detail with reference to FIG. 4.

Figure 4:
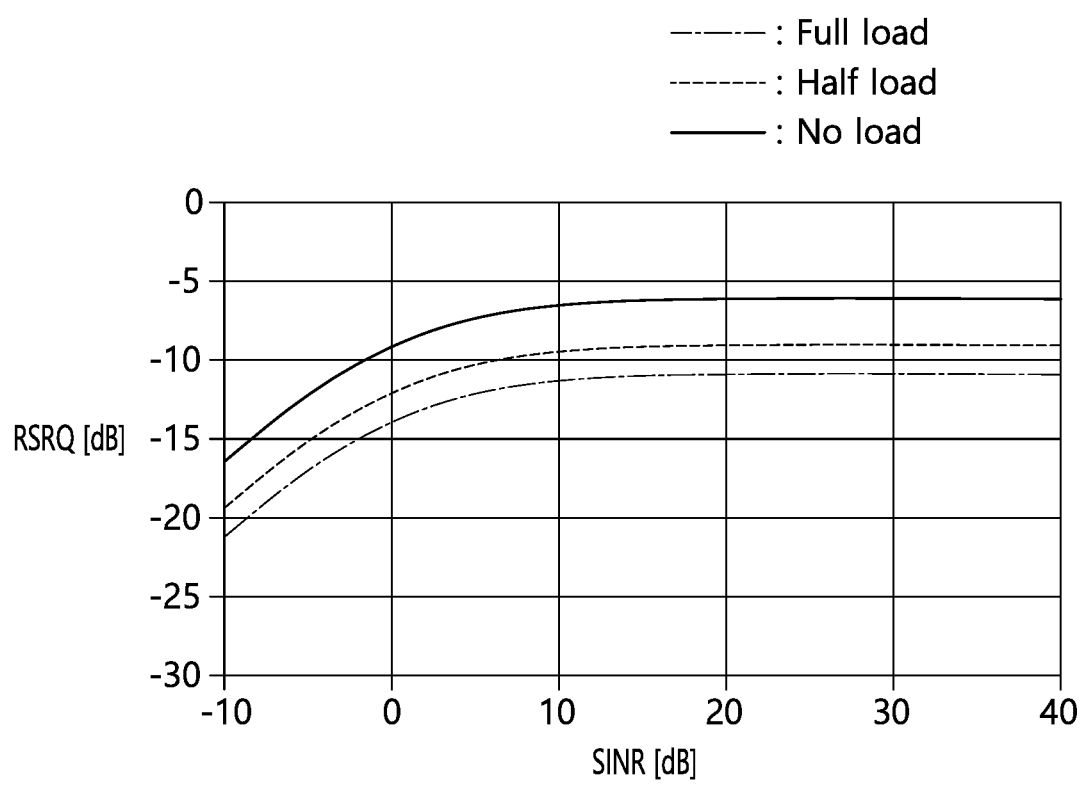
FIG. 4 illustrates the relationship between SINR and RSRQ.

FIG. 4 illustrates the relationship between SINR and RSRQ.

Referring to FIG. 4, RSRQ remains the same when SINR>10 [dB]. That is, in the case of a full load, when SINR exceeds 10 [dB], RSRQ has a value of about −6 [dB] regardless of an increase in SINR. In the case of a half load, and when SINR exceeds 10 [dB], RSRQ has a value of about −9 [dB] regardless of an increase in SINR. In the case of no load, when SINR exceeds 10 [dB], RSRQ has a value of about −11 [dB] regardless of an increase in SINR. Therefore, RSRQ may be difficult to use for the mobility of a UE in a high-SINR area.

However, RSRQ has an advantage of simple calculation, compared with RS-SINR. This advantage is the main reason why RSRQ, instead of RS-SINR, is specified as a measurement quantity in Rel-8 and subsequent specifications. Currently, RS-SINR measurement has already been implemented in many terminals for antenna bar display and radio link monitoring (RLM) on the Android platform. However, because RS-SINR requires a measurement/sample period similar to RSRP/RSRQ in order to support mobility, additional power consumption may occur due to RS-SINR measurement. A potential disadvantage of RS-SINR is that noise and interference observed outside a CRS cannot be taken into account for RS-SINR. When an interfering cell has a very small load and very few CRSs collide with a serving cell, RS-SINR may be underestimated.

Table 1 below shows the advantages and disadvantages of RSRQ and RS-SINR.

TABLE 1

| Measurement quantity | Disadvantage | Advantage |
| --- | --- | --- |
| RSRQ | Restricted dynamic range in high-SINR area Dependent on load of serving cell and inaccurate throughput assessment | Low complexity |
| RS-SINR | Since only CRSs are measured, RS-SINR may be inaccurate when an interfering cell has a very small load and very few CRSs collide with a serving cell | Irrelevant to load of serving cell load Can be used to assess throughput of target cell |

In multicarrier load balancing for maximal user throughput, a current RSRQ-based load balancing mechanism may not guarantee optimal throughput in a high-SINR area, which has already been described with reference to FIG. 4. On the other hand, RS-SINR measurement is suitable to represent achievable throughput as compared with RSRQ measurement but may be complicated to implement as compared to RSRQ measurement. Accordingly, the present invention proposes a method for a UE to perform channel state measurement.

According to one embodiment of the present invention, a UE may determine whether additional RS-SINR measurement as well as RSRP/RSRQ measurement is required in load balancing. The UE may determine whether additional RS-SINR measurement is required in a high-SINR area using a threshold for specifying the boundary of the dynamic range of RSRQ in terms of SINR. In this specification, the threshold for specifying the boundary of the dynamic range of RSRQ may be referred to as an RSRQ threshold. The RSRQ threshold may be set by the UE or received from a network.

Figure 5:
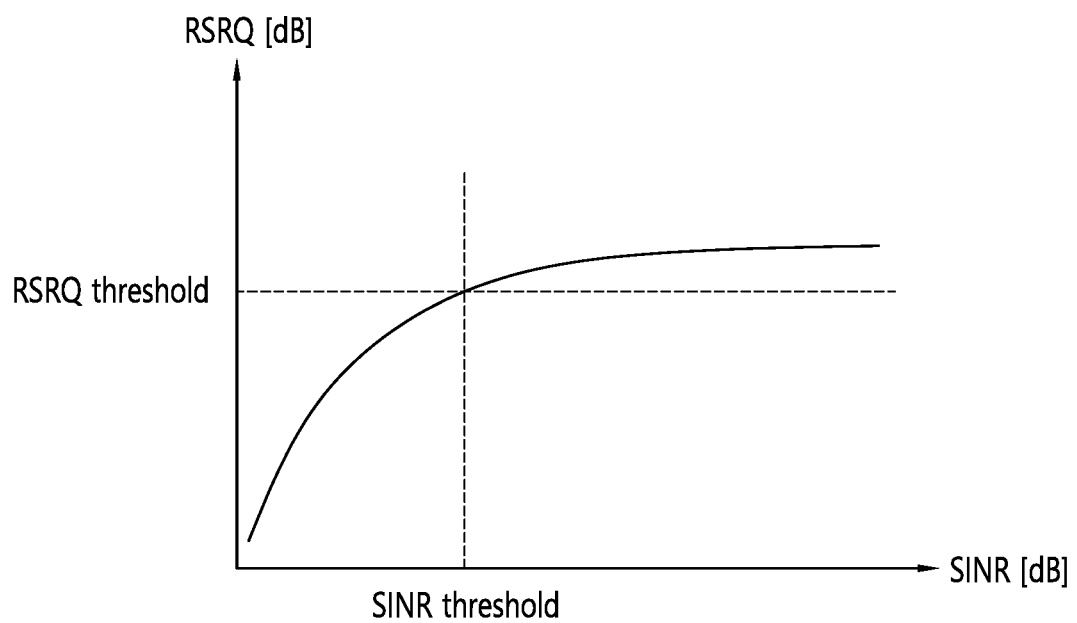
FIG. 5 illustrates an example of setting an RSRQ threshold in the relationship between SINR and RSRQ according to one embodiment of the present invention.

FIG. 5 illustrates an example of setting an RSRQ threshold in the relationship between SINR and RSRQ according to one embodiment of the present invention.

Referring to FIG. 5, the RSRQ threshold may be set by a curve that specifies characteristics of the relationship between SINR and RSRQ. The RSRQ threshold may be set by a UE. Alternatively, the RSRQ threshold may be received from a network.

1. First Method

When the RSRQ of a neighboring cell is greater than the RSRQ threshold (that is, RSRQ of neighboring cell>RSRQ threshold), the UE may measure the RS-SINR of the neighboring cell. The measurement of the RS-SINR of the neighboring cell may be measurement additionally performed.

When the RSRQ of the neighboring cell is less than or equal to the RSRQ threshold (that is, RSRQ of neighboring cell≤RSRQ threshold), the UE may not measure the RS-SINR of the neighboring cell. Alternatively, the UE may not allow the measurement of the RS-SINR of the neighboring cell.

2. Second Method

In order to prevent frequent switches between starting and stopping measuring the RS-SINR of the neighboring cell due to a change in the RSRQ of the neighboring cell at the RSRQ threshold point, the following method may be considered.

(1) Initial Measurement Step: Compare RSRQ Threshold with RSRQ of Neighboring Cell The initial measurement step may refer to a step before the UE starts measuring the RS-SINR of the neighboring cell. That is, the initial measurement step may refer to a step in which the UE is not measuring the RS-SINR of the neighboring cell.

In the initial measurement step, when the RSRQ of the neighboring cell is greater than the RSRQ threshold (that is, RSRQ of neighboring cell>RSRQ threshold), the UE may measure the RS-SINR of the neighboring cell. The measurement of the RS-SINR of the neighboring cell may be measurement additionally performed.

In the initial measurement step, when the RSRQ of the neighboring cell is less than or equal to the RSRQ threshold (that is, RSRQ of neighboring cell≤RSRQ threshold), the UE may not measure the RS-SINR of the neighboring cell. Alternatively, the UE may not allow the measurement of the RS-SINR of the neighboring cell.

That is, the initial measurement step may be the same as the condition of the first method.

(2) Subsequent Measurement Step: Compare RSRQ Threshold with RSRQ of Neighboring Cell Plus Hysteresis The subsequent measurement step may refer to a step after the UE finishes measuring the RS-SINR of the neighboring cell. That is, the subsequent measurement step may refer to a step in which the UE is measuring the RS-SINR of the neighboring cell. For example, in the initial measurement step, when the RSRQ of the neighboring cell exceeds the RSRQ threshold so that the UE measures the RS-SINR of the neighboring cell and the UE is measuring the RS-SINR of the neighboring cell, the UE may be considered to be in the subsequent measurement step. In addition, the UE that is measuring the RS-SINR may also be continuously performing the RSRQ measurement.

In the subsequent measurement step, when a value of the RSRQ of the neighboring cell plus a hysteresis is greater than the RSRQ threshold (that is, RSRQ of neighboring cell+hysteresis>RSRQ threshold), the UE may continue to measure the RS-SINR of the neighboring cell.

In the subsequent measurement step, when the value of the RSRQ of the neighboring cell plus the hysteresis is equal to or less than the RSRQ threshold (that is, RSRQ of neighboring cell+hysteresis≤RSRQ threshold), the UE may stop measuring the RS-SINR of the neighboring cell. Thereafter, the UE may depart from the subsequent measurement step to enter an initial measurement step.

When the UE is measuring the RS-SINR of the neighboring cell (that is, in the subsequent measurement step), the UE may compare the value of the RSRQ of the neighboring cell plus the hysteresis with the RSRQ threshold, thereby preventing frequent switches between starting and stopping measuring the RS-SINR. The hysteresis may be a positive number.

According to the embodiment of the present invention, it is possible to perform more accurate channel measurement by supplementing the disadvantage of RSRQ having a limited dynamic range in a high-SINR area and the disadvantage of RS-SINR having high power consumption due to complicated calculation compared to RSRQ.

Figure 6:
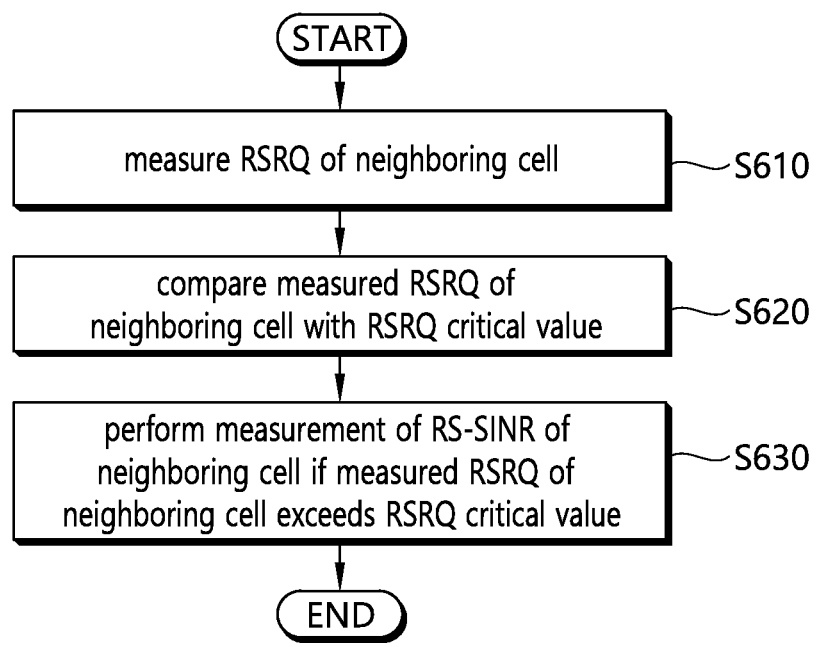
FIG. 6 is a block diagram illustrating a method for measuring, by a UE, a channel state according to one embodiment of the present invention.

FIG. 6 is a block diagram illustrating a method for measuring, by a UE, a channel state according to one embodiment of the present invention.

Referring to FIG. 6, the UE may measure the RSRQ of a neighboring cell (S610).

The UE may compare the measured RSRQ of the neighboring cell with a RSRQ threshold (S620). The RSRQ threshold may be set by the UE. The RSRQ threshold may be received from a network.

When the measured RSRQ of the neighboring cell exceeds the RSRQ threshold, the UE may measure the RS-SINR of the neighboring cell (S630). The RS-SINR of the neighboring cell may be measured in an initial measurement step, and the initial measurement step may be a step in which the UE is not measuring the RS-SINR of the neighboring cell.

When the measured RSRQ of the neighboring cell is the RSRQ threshold or less, the UE may stop measuring the RS-SINR of the neighboring cell.

When a value of the measured RSRQ of the neighboring cell plus a hysteresis exceeds the RSRQ threshold, the UE may measure the RS-SINR of the neighboring cell. The hysteresis may be applied in a subsequent measurement step, and the subsequent measurement step may be a step in which the UE is measuring the RS-SINR of the neighboring cell. The hysteresis may be a positive number.

When the value of the measured RSRQ of the neighboring cell plus the hysteresis is the RSRQ threshold or less, the UE may further stop measuring the RS-SINR of the neighboring cell. The hysteresis may be applied in a subsequent measurement step, and the subsequent measurement step may be a step in which the UE is measuring the RS-SINR of the neighboring cell. The hysteresis may be a positive number.

Figure 7:
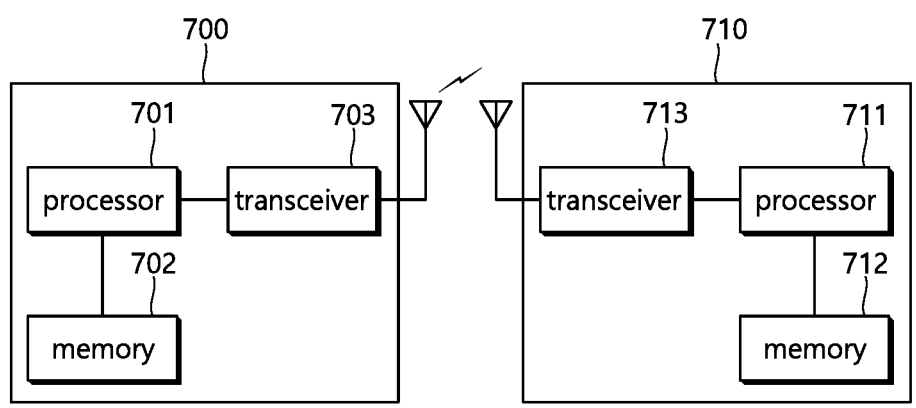
FIG. 7 is a block diagram illustrating a wireless communication system according to the embodiment of the present invention.

FIG. 7 is a block diagram illustrating a wireless communication system according to the embodiment of the present invention.

A BS 700 includes a processor 701, a memory 702 and a transceiver 1803. The memory 702 is connected to the processor 701, and stores various information for driving the processor 701. The transceiver 703 is connected to the processor 701, and transmits and/or receives radio signals. The processor 701 implements proposed functions, processes and/or methods. In the above embodiment, an operation of the base station may be implemented by the processor 701.

A UE 1810 includes a processor 711, a memory 712 and a transceiver 713. The memory 712 is connected to the processor 711, and stores various information for driving the processor 711. The transceiver 713 is connected to the processor 711, and transmits and/or receives radio signals. The processor 711 implements proposed functions, processes and/or methods. In the above embodiment, an operation of the UE may be implemented by the processor 711.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a user equipment (UE) measuring a channel state in a wireless communication system, the method comprising:

measuring a reference signal received quality (RSRQ) of a neighboring cell periodically; and when the RSRQ of the neighboring cell exceeds a RSRQ threshold:

initiating an additional measurement on the neighbor cell based on a reference signal signal-to-interference-and-noise ratio (RS-SINR); and performing a load balancing based on a result of the additional measurement;

when the RSRQ of the neighboring cell does not exceed the RSRQ threshold:

performing the load balancing based on the RSRQ of the neighbor cell, wherein the additional measurement is stopped when a sum of a hysteresis and the RSRQ of the neighboring cell becomes less than the RSRP threshold, upon initiating the additional measurement.

2. The method of claim 1, wherein the hysteresis is a positive number.

3. The method of claim 1, wherein the RSRQ threshold is set by the UE.

4. The method of claim 1, wherein the RSRQ threshold is received from a network.

5. A user equipment (UE) measuring a channel state in a wireless communication system, the UE comprising:

a memory;

a transceiver; and a processor to connect the memory and the transceiver, wherein the processor is configured to:

measure a reference signal received quality (RSRQ) of a neighboring cell; and when the RSRQ of the neighboring cell exceeds a RSRQ threshold:

initiate an additional measurement on the neighbor cell based on a reference signal signal-to-interference-and-noise ratio (RS-SINR); and perform a load balancing based on a result of the additional measurement;

when the RSRQ of the neighboring cell does not exceed the RSRQ threshold:

perform the load balancing based on the RSRQ of the neighbor cell, wherein the additional measurement is stopped when a sum of a hysteresis and the RSRQ of the neighboring cell becomes less than the RSRP threshold, upon initiating the additional measurement.

* * * * *